US012572843B2

(12) United States Patent
Miyajima

(10) Patent No.: US 12,572,843 B2
(45) Date of Patent: Mar. 10, 2026

(54) AGENT SYSTEM FOR CONTENT RECOMMENDATIONS

(71) Applicant: SONY CORPORATION, Tokyo (JP)

(72) Inventor: Yasushi Miyajima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1297 days.

(21) Appl. No.: 17/250,758

(22) PCT Filed: Aug. 23, 2019

(86) PCT No.: PCT/JP2019/033040
§ 371 (c)(1),
(2) Date: Mar. 1, 2021

(87) PCT Pub. No.: WO2020/054361
PCT Pub. Date: Mar. 19, 2020

(65) Prior Publication Data
US 2021/0319361 A1 Oct. 14, 2021

(30) Foreign Application Priority Data
Sep. 11, 2018 (JP) ................................. 2018-169441

(51) Int. Cl.
*G06N 20/00* (2019.01)
*G06F 16/23* (2019.01)
*G06F 16/9535* (2019.01)

(52) U.S. Cl.
CPC ......... *G06N 20/00* (2019.01); *G06F 16/2379* (2019.01); *G06F 16/9535* (2019.01)

(58) Field of Classification Search
CPC .... G06N 20/00; G06N 3/006; G06F 16/2379; G06F 16/9535; G06F 16/9035
See application file for complete search history.

(56) References Cited

U.S. PATENT DOCUMENTS

| | | | | | |
|---|---|---|---|---|---|
| 2008/0311889 | A1* | 12/2008 | Dunko | ................. | H04L 67/535 |
| | | | | | 455/418 |
| 2013/0257877 | A1* | 10/2013 | Davis | .................... | G06N 3/006 |
| | | | | | 345/473 |
| 2013/0290905 | A1* | 10/2013 | LuVogt | ................. | G06N 3/006 |
| | | | | | 715/835 |
| 2014/0359439 | A1* | 12/2014 | Lyren | ................. | G06F 16/9538 |
| | | | | | 707/706 |

(Continued)

FOREIGN PATENT DOCUMENTS

| | | |
|---|---|---|
| CN | 107924372 A | 4/2018 |
| EP | 3367250 A1 | 8/2018 |

(Continued)

OTHER PUBLICATIONS

International Search Report and Written Opinion of PCT Application No. PCT/JP2019/033040, issued on Oct. 21, 2019, 08 pages of ISRWO.

*Primary Examiner* — Imad Kassim
(74) *Attorney, Agent, or Firm* — CHIP LAW GROUP

(57) ABSTRACT

An information processing system (1) that provide an agent service to users includes: a database that stores a plurality of agents optimized for respective users when the agent service is used; and a control unit (100) that selects a base agent candidate from the plurality of agents stored in the database according to an attribute or feature of a new user who newly uses the agent service.

9 Claims, 11 Drawing Sheets

(56) References Cited

U.S. PATENT DOCUMENTS

| 2016/0119477 | A1* | 4/2016 | Sharpe | G06Q 30/0261 |
| | | | | 379/265.09 |
| 2016/0180222 | A1* | 6/2016 | Sierhuis | G06Q 10/06398 |
| | | | | 706/47 |
| 2018/0053119 | A1* | 2/2018 | Zeng | H04M 3/5183 |
| 2018/0241701 | A1 | 8/2018 | Miyajima | |

FOREIGN PATENT DOCUMENTS

| JP | 2002-132604 A | 5/2002 |
| JP | 2002-268901 A | 9/2002 |
| JP | 2011-511968 A | 4/2011 |
| KR | 10-2018-0073566 A | 7/2018 |
| WO | 2017/068817 A1 | 4/2017 |

* cited by examiner

FIG. 1

1: INFORMATION PROCESSING SYSTEM

FIG. 2

1: INFORMATION PROCESSING SYSTEM

10 INFORMATION PROCESSING TERMINAL

100 CONTROL UNIT

110 COMMUNICATION UNIT

103 SPEECH CONTROL UNIT

101 VOICE/OPERATION RECOGNITION UNIT

102 IMAGE ANALYSIS UNIT

150 VOICE OUTPUT UNIT

160 STORAGE UNIT

120 VOICE INPUT UNIT

130 OPERATION INPUT UNIT

140 CAMERA

FIG. 4

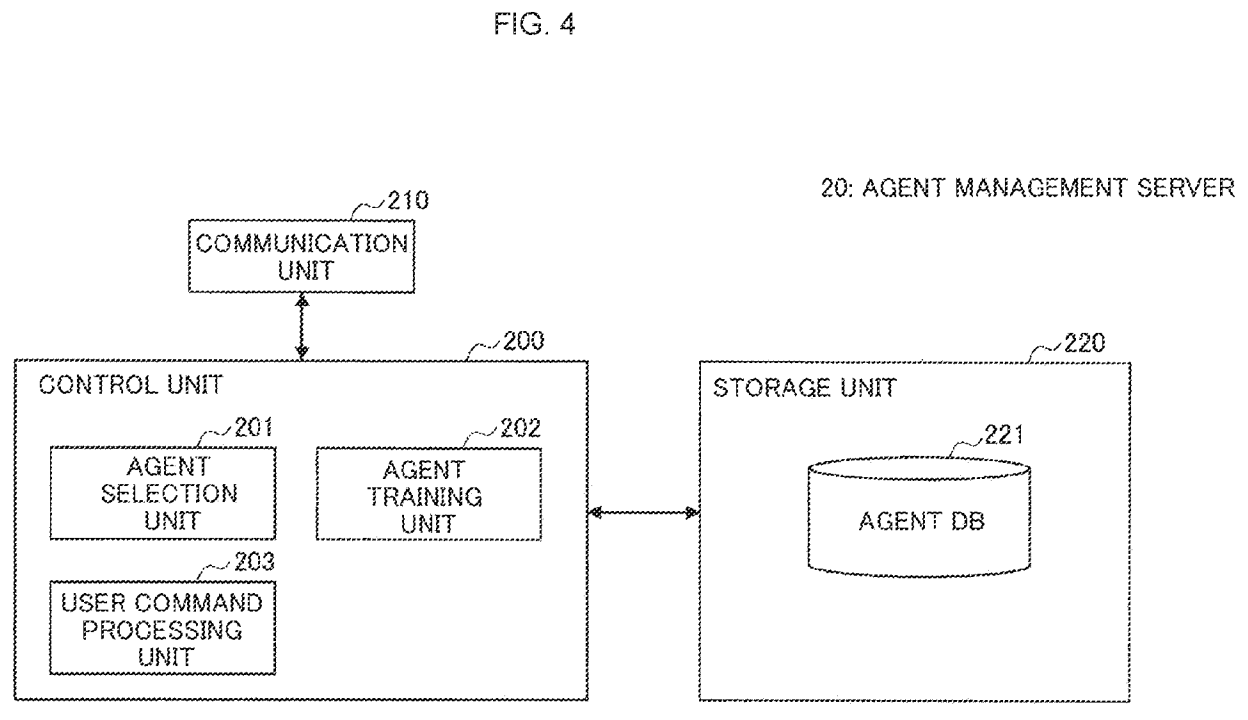

20: AGENT MANAGEMENT SERVER

COMMUNICATION UNIT 210

CONTROL UNIT 200

AGENT SELECTION UNIT 201

USER COMMAND PROCESSING UNIT 203

AGENT TRAINING UNIT 202

STORAGE UNIT 220

AGENT DB 221

FIG. 6

| ATTRIBUTE AND FEATURE VALUE | VALUE |
|---|---|
| RESIDENT FAMILY | 4 PERSONS |
| CHILDREN | 2 PERSONS |
| CHILDREN AGES | [ELEMENTARY SCHOOL, MIDDLE SCHOOL] |
| CHILDREN GENDER | [BOY, GIRL] |
| SPOUSE | PRESENT |
| PARENT AGES | [40S, 30S] |
| HOLIDAY | SATURDAYS, SUNDAYS, NATIONAL HOLIDAYS |
| AVERAGE TIME TO COME HOME | 21:00 PM |
| AVERAGE TIME TO GO BED | MONDAY TO THURSDAY: 24:00 PM DAY BEFORE HOLIDAY: 01:00 AM |
| AVERAGE GATHERING TIME (PER WEEK) | 7.5 |
| AVERAGE WAKEUP TIME | WEEKDAYS: 6:30 AM HOLIDAYS: 8:00 AM |
| DRINKING FREQUENCY | 100% ON DAY BEFORE HOLIDAY |
| POLITENESS OF WORDING | 0.8 (POLITE) |
| FREQUENCY OF QUARRELS BETWEEN COUPLES | 1.2 TIMES/MONTH |
| FREQUENCY OF FAMILY QUARRELS | 10 TIMES/MONTH |
| ROOM CLUTTER LEVEL | 3.5 |
| MUSIC GENRE THAT FATHER PREFERS WHEN HE IS ALONE | HARD ROCK, METAL |
| MUSIC GENRE THAT MOTHER PREFERS WHEN THEY ARE ALONE | J-POP |
| MUSIC GENRE THAT COUPLES PREFER WHEN THEY ARE TOGETHER | J-POP, WESTERN POPS |
| MUSIC GENRE THAT CHILDREN PREFER WHEN THEY ARE TOGETHER | ANIMATION, J-POP |
| TV PROGRAM GENRES THAT THEY OFTEN WATCH | ANIMATION, NEWS |
| FAMILY FAVORITE MEAL | SUKIYAKI |
| ACCEPTANCE TENDENCY | WHEN DRINKING, THE NIGHT BEFORE HOLIDAY |
| ... | ... |

FIG. 7

INITIAL ATTRIBUTE AND FEATURE
VALUE OF NEW USER

| ATTRIBUTE AND FEATURE VALUE | VALUE |
|---|---|
| RESIDENT FAMILY | 4 PERSONS |
| CHILDREN | 2 PERSONS |
| CHILDREN GENDER | [BOY, GIRL] |
| SPOUSE | PRESENT |
| PARENT AGES | [40S, 30S] |

SELECTION
(MATCHING) OF
BASE AGENT
CANDIDATE

NUMBER OF ATTRIBUTES
AND FEATURE VALUES
INCREASE WITH USE

| ATTRIBUTE AND FEATURE VALUE | VALUE |
|---|---|
| RESIDENT FAMILY | 4 PERSONS |
| CHILDREN | 2 PERSONS |
| CHILDREN GENDER | [BOY, GIRL] |
| SPOUSE | PRESENT |
| PARENT AGES | [40S, 30S] |
| HOLIDAY | SATURDAYS, SUNDAYS, NATIONAL HOLIDAYS |
| AVERAGE WAKEUP TIME | WEEKDAYS: 7 AM HOLIDAYS: 8 AM |
| TV PROGRAM GENRES THAT THEY OFTEN WATCH | ANIMATION, DRAMA, MOVIE |

RESELECTION
OF BASE AGENT
CANDIDATE

DECISION OF
BASE AGENT

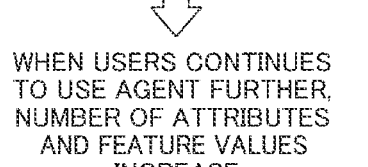

WHEN USERS CONTINUES
TO USE AGENT FURTHER,
NUMBER OF ATTRIBUTES
AND FEATURE VALUES
INCREASE

UPDATING
(TRAINING)
OF DECIDED
BASE AGENT

AGENT SYSTEM FOR CONTENT RECOMMENDATIONS

CROSS REFERENCE TO RELATED APPLICATIONS

This application is a U.S. National Phase of International Patent Application No. PCT/JP2019/033040 filed on Aug. 23, 2019, which claims priority benefit of Japanese Patent Application No. JP 2018-169441 filed in the Japan Patent Office on Sep. 11, 2018. Each of the above-referenced applications is hereby incorporated herein by reference in its entirety.

TECHNICAL FIELD

The present disclosure relates to an information processing system, an information processing method, and a recording medium.

BACKGROUND ART

In recent years, an agent system that recommends contents and provides information according to the user's request using a mobile terminal such as a smartphone, a tablet terminal, or a wearable device, or a dedicated terminal such as a smart speaker has been known. Such an agent system can grow by machine-learning the requests and optimal solutions of all users on the cloud.

For example, PTL 1 below relates to a recommendation method of providing information on a mobile device and discloses a system that generates a recommendation list by referring to data related to contents available to a user on the basis of analysis of data correlated with the user.

PTL 2 below discloses an agent system that enables an electronic pet as an agent satisfying desired conditions to be provided to a specific user only.

PTL 3 below discloses a system capable of memorizing the user's preference by answering a questionnaire when generating a character agent and introducing a sales agent that matches the user's preference.

CITATION LIST

Patent Literature

[PTL 1]
  Japanese Translation of PCT Application No. 2011-511968
[PTL 2]
  JP 2002-268901 A
[PTL 3]
  JP 2002-132604 A

SUMMARY

Technical Problem

In an agent system operated by voice from an information processing terminal connected to the cloud, as described above, a centralized sharing agent based on big data learning is provided, and a common agent optimized for all users grows on the cloud. In such a system using the centralized sharing agent, it is possible to always interact with the latest agent even when a new user is added. However, it is generally difficult to present advice personalized to an individual or a small community unit such as a family.

It is also possible to learn the operation contents of users and optimize the agent individually. However, since it takes some operations and time from an initial state to the optimization, it is difficult to start the agent comfortably when the agent is purchased.

Therefore, the present disclosure proposes an information processing system, an information processing method, and a recording medium capable of setting an optimal agent personalized to a new user.

Solution to Problem

According to the present disclosure, there is proposed an information processing system that provides an agent service to users, including: a database that stores agents optimized for respective users when the agent service is used; and a control unit that selects a base agent candidate from a plurality of the agents stored in the database according to an attribute or feature of a new user who newly uses the agent service.

According to the present disclosure, there is proposed an information processing method for causing a processor to execute: storing, in a database, a plurality of agents optimized for respective users when an agent service in an information processing system that provides the agent service to users is used; and selecting a base agent candidate from the plurality of agents stored in the database according to an attribute or feature of a new user who newly uses the agent service.

According to the present disclosure, there is proposed a recording medium having a program recorded thereon, the program causing a computer to function as: a database that stores a plurality of agents optimized for respective users when an agent service in an information processing system that provides the agent service to users is used; and a control unit that selects a base agent candidate from the plurality of agents stored in the database according to an attribute or feature of a new user who newly uses the agent service.

Advantageous Effects of Invention

As described above, according to the present disclosure, it is possible to set an optimal agent personalized to a new user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram illustrating an overview of an information processing system according to an embodiment of the present disclosure.

FIG. 2 is a diagram illustrating an example of an entire configuration of the information processing system according to the present embodiment.

FIG. 4 is a block diagram illustrating an example of a configuration of an agent management server according to the present embodiment.

FIG. 6 is a diagram illustrating an example of user attribute and feature value information according to the present embodiment.

FIG. 7 is a diagram illustrating a general flow of selection, decision, and updating (training) of base agent candidates according to the present embodiment.

DESCRIPTION OF EMBODIMENTS

Figure 3:
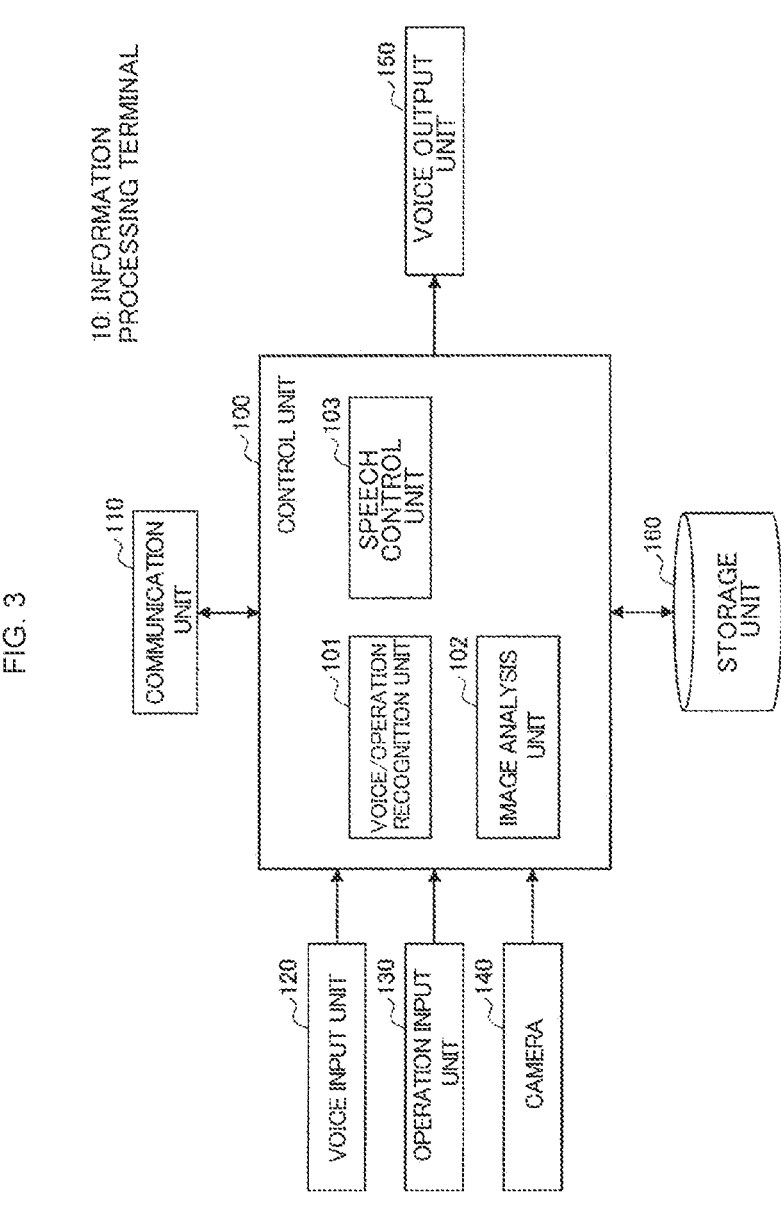
FIG. 3 is a block diagram illustrating an example of a configuration of an information processing terminal according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Overview of information processing system according to embodiment of present disclosure
2. Configuration
2-1. Configuration of information processing terminal 10
2-2. Configuration of agent management server 20
3. Operation process
3-1. Base agent candidate selection process
3-2. Base agent decision process
3-3. Base agent training process
3-4. Agent publication approval process
4. Conclusion

1. OVERVIEW OF INFORMATION PROCESSING SYSTEM ACCORDING TO EMBODIMENT OF PRESENT DISCLOSURE

Figure 1:
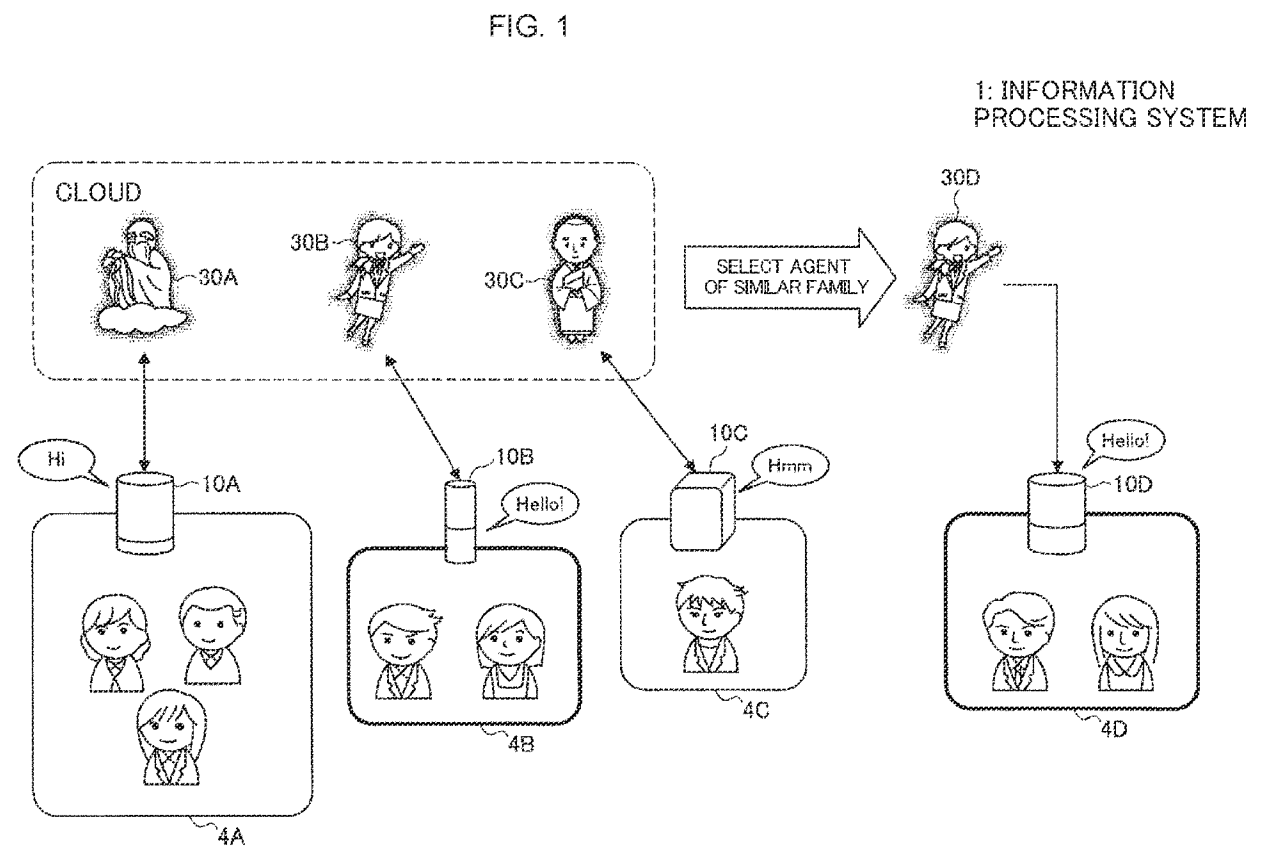

FIG. 1 is a diagram illustrating an overview of an information processing system according to an embodiment of the present disclosure. As illustrated in FIG. 1, an information processing system 1 according to the present embodiment is an agent system in which agents 30 (30A to 30C) individually optimized for users are provided using various information processing terminals 10 such as a smart speaker connected to the cloud.

Here, the "user" means one or more persons, and as illustrated in FIG. 1, a small community unit such as a family using the information processing terminal 10 is also referred to as a user.

In the present embodiment, a smart speaker is used as the information processing terminal 10 and a voice agent system is exemplified as the information processing system 1. However, the present embodiment is not limited thereto, and an interface of an agent may display images without being limited to voice using a smartphone, a mobile phone, a tablet terminal, a wearable device, a projector, and the like.

The agent 30 grows on the cloud so as to be optimized to users by individually machine-learning preference information, a living pattern, and the like of users by interacting with users and analyzing camera images. Therefore, in FIG. 1, the agents 30A to 30C are illustrated as different agents as agents individually optimized (already trained to some extent or for many years) to respective users. The characters of the agents illustrated in FIG. 1 are examples only, and the present embodiment is not limited thereto.

In the present specification, the "agent" is software that autonomously provides various kinds of information to users, supports actions of users, and interacts with users via voice and can be operated by various forms of information processing terminals 10. The request or context of the user is acquired on the basis of analyzing captured images and voice data acquired by a camera and a microphone (hereinafter also referred to as a mic) and analyzing an operation input content acquired by an operation input unit such as a button, a keyboard, and a switch. In the cloud, a corresponding agent obtains an answer to the user's request or context and presents the answer to the user from the speaker or the display unit of the information processing terminal 10. Each agent can be individually optimized by growing by machine-learning an optimal solution to the user's request or context.

The "agent" may be a new agent system (referred to as a master system) that encourages users to change their action in order to approach problem solving from a long-term perspective, for example, as well as a general agent system that directly provides one session of a short-term response to users. Here, the master is the name (a master-like existence) of a virtual agent that encourages users to change their action spontaneously. For example, a master system automatically generates predetermined action rules (means for solving problems in a community, predetermined value criteria (that is, values), a predetermined rhythm of life, and the like) for each specific community or user and indirectly encourages the community or user to change the action on the basis of the action rules to solve the problems of the community. That is, while the user is acting according to the words of the master, even if the user is not aware of the action rules, the problems in the community are solved without realizing the same, the user can take actions conforming to the value criteria, and the situation of the community is improved.

Background

As described above, since it takes some operations and many years of time for agents to individually grow by learning interactions with users, it is difficult to start the agent comfortably in an initial state when the agent is purchased.

Therefore, the information processing system 1 according to the present embodiment enables an optimal agent personalized to a new user to be set to thereby eliminate a cold start problem.

That is, in an agent form that is optimized to individual family members or individuals rather than an entirely sharing global agent, an agent (already trained to some extent or for many years) which is estimated to be most suitable for that family (new user) immediately after purchase and is already used by another family member is set (selected) as an initial agent of the new user (a candidate for a base agent, hereinafter referred to as a base agent candidate).

Figure 5:
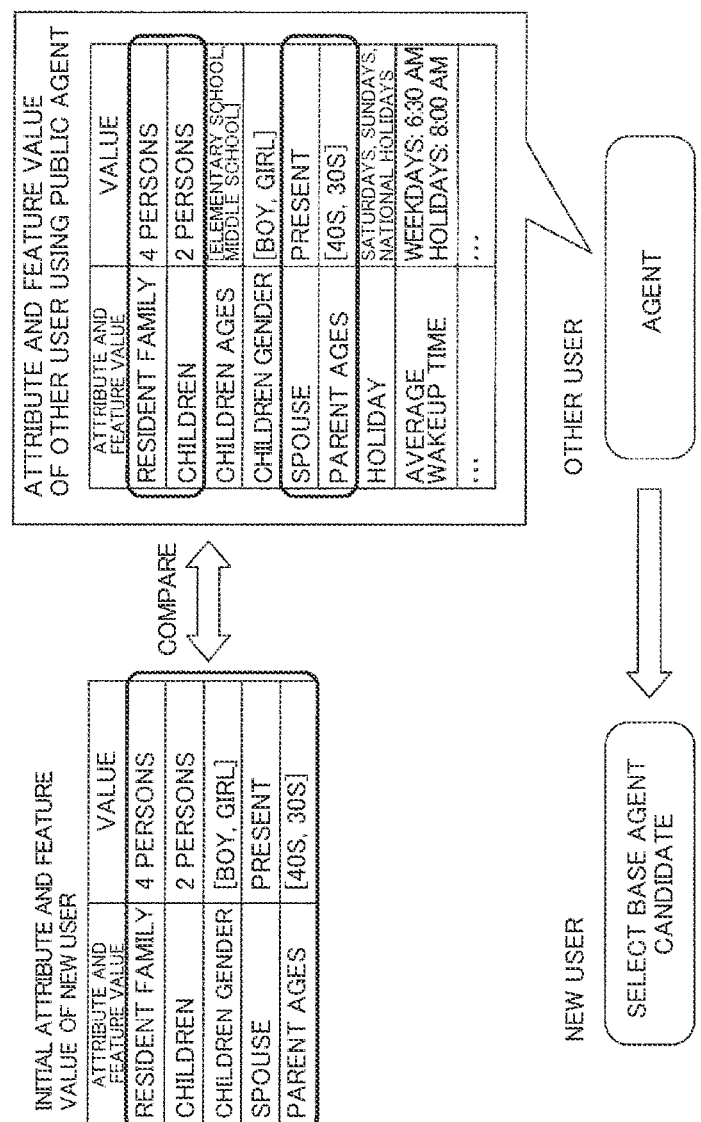
FIG. 5 is a diagram illustrating the selection of base agent candidates based on matching using attribute and feature value information of a new user as parameters according to the present embodiment.

In the cloud, agents already trained by each user are present, and this system can eliminate the cold start problem by (copying and) setting an agent already used by another user having attribute and feature value information similar to or the same as the attribute and feature value information of a new user who wants to purchase a new agent as a base agent (selection of base agent candidate based on matching using attribute and feature value information as parameters, see FIG. 5).

For example, in the example illustrated in FIG. 1, when the agents 30A to 30C already trained by each user are present on the cloud, a user 4B having similar parameters to a family structure (number of members and ages) or the like of a user 4D (family) who purchases a new agent is specified by matching. The agent 30B used by the user is selected as an agent of the new user 4D. An agent already trained by another user having a similar parameter such as a family structure is expected to fit a new user to some extent (that is, the agent can be regarded as being personalized to the user to some extent). In this way, it is possible to start with an agent that is regarded as being individualized to the user some extent in an initial state and use the agent comfortably.

Here, examples of the attribute information include "nationality, address, mother tongue, age, gender, family structure, family age, and the like", and examples of the feature value information include "preference, personality, ability, and the like". The attribute and feature value information can be collected while the user is using the agent. For example, when the user is "family", "family structure, family age, wake-up time, gathering time, dinner time, room clutter, amount of exercise, intimacy (frequency of quarrels) ", and the like are collected as the attribute and feature value information (family information), for example (see FIG. 6 for further specific examples).

The attribute and feature value information of a new user used when selecting (matching) a base agent candidate is not particularly limited as long as those that can be acquired in an initial stage are used. Moreover, within a certain period from the purchase of an agent, matching may be performed repeatedly as the information on the attributes and feature value of the new user is added and updated at any time so that a more compatible agent is set (reselection of base agent candidate). The re-matching of the base agent ends after the elapse of a certain period or when the new user performs a decision operation (decision of base agent). After that, the agent starts growing individually as an agent dedicated for the new user (updating of an agent decided as a base agent). The details will be described later with reference to FIG. 7. The user may arbitrarily set whether the agent grown individually in this manner will be open on the cloud (whether the agent will be used as a matching target when another new user purchases an agent). Moreover, the user may arbitrarily select whether the user attribute and feature value information will be used for matching for respective items.

(System Configuration)

Figure 2:
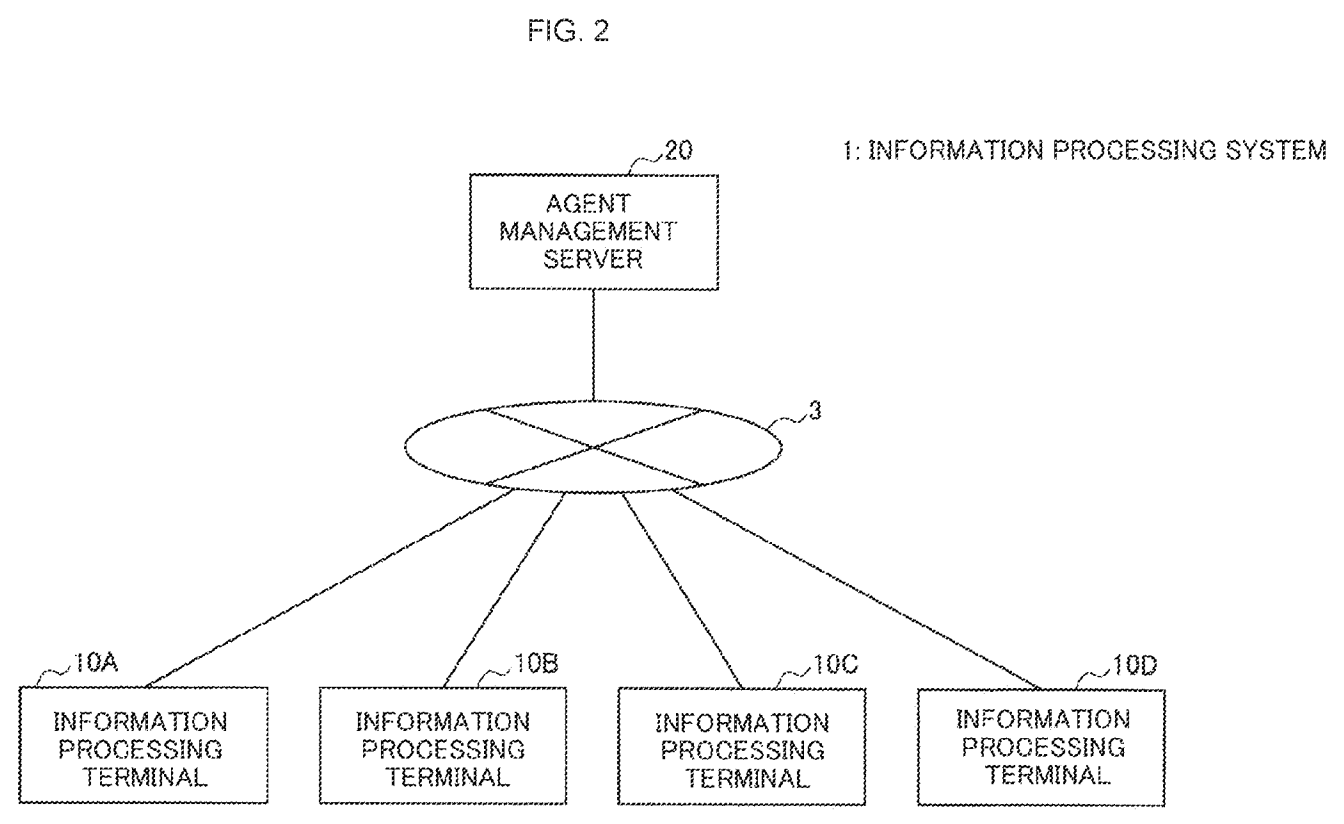

Next, an overall configuration of the information processing system according to the present embodiment will be described with reference to FIG. 2. FIG. 2 is a diagram illustrating an example of an overall configuration of the information processing system 1 according to the present embodiment.

As illustrated in FIG. 2, the information processing system according to the present embodiment includes an information processing terminal 10 and an agent management server 20. The information processing terminal 10 and the agent management server 20 are communicably connected via a network 3, for example, and can transmit and receive data to and from each other.

The information processing terminal 10 may be realized, for example, as a smart speaker, a smartphone, a tablet terminal, a wearable device (HMD (Head Mounted Display), a smart band, a smart watch, a smart earphone, a smart neck speaker, or the like), a PC, a TV device, or a home projector.

The agent management server 20 can perform a process of storing attribute and feature value information of a user as agent information, machine-learning interactions with the user, and optimizing respective agents individually. Moreover, the agent management server 20 can perform the matching based on the attribute information and the like of a new user and selection of the base agent.

Hereinabove, the information processing system according to an embodiment of the present disclosure has been described. Next, a specific configuration of each device included in the information processing system according to the present embodiment will be described with reference to the drawings.

2. CONFIGURATION

<2-1. Configuration of Information Processing Terminal 10>

FIG. 3 is a block diagram illustrating an example of a configuration of the information processing terminal 10 according to the present embodiment. As illustrated in FIG. 3, the information processing terminal 10 includes a control unit 100, a communication unit 110, a voice input unit 120, an operation input unit 130, a camera 140, a voice output unit 150, and a storage unit 160.

The control unit 100 functions as an arithmetic processing device and a control device and controls an overall operation of the information processing terminal 10 according to various programs. The control unit 100 is realized as an electronic circuit such as, for example, a CPU (central processing unit) or a microprocessor. The control unit 100 may include a ROM (read only memory) that stores programs to be used, calculation parameters, and the like and a RAM (random access memory) that temporarily stores parameters and the like that change as appropriate.

The control unit 100 according to the present embodiment also functions as a voice/operation recognition unit 101, an image analysis unit 102, and a speech control unit 103.

The voice/operation recognition unit 101 performs recognition (natural language processing) of a user's voice acquired from the voice input unit 120 and recognition of a user's operation acquired from the operation input unit 130. The image analysis unit 102 can analyze a captured image captured by the camera 140 to recognize the user's face and recognize the surrounding environment. The user's request or context is acquired (by the control unit 100) from the recognition result of the voice/operation recognition unit 101 and the analysis result of the image analysis unit 102 and is transmitted to the agent management server 20. The recognition result and the analysis result may be transmitted to the agent management server 20 and the user's request or context may be acquired by the agent management server 20. The agent management server 20 generates an answer (optimal solution) of the agent with respect to the user's request or context (that is, performs user command processing).

The control unit 100 acquires the user attribute and feature value information from the recognition result of the voice/operation recognition unit 101 and the analysis result of the image analysis unit 102 and stores the same in the storage unit 160 and transmits the same to the agent management server 20 as appropriate.

The speech control unit 103 controls the speech of the agent voice from the voice output unit 150. For example, the speech control unit 103 generates an agent voice on the basis of the user command processing result acquired from the agent management server 20 and plays the agent voice from the voice output unit 150. The agent voice may be generated by the agent management server 20. Moreover, a response may be generated locally by the speech control unit 103 without checking schedule information managed locally or asking the cloud about the time information.

(Communication Unit 110)

The communication unit 110 can connect to the network 3 via cable or wirelessly to transmit and receive data to and from the agent management server 20 on the network. The communication unit 110 communicates with the network 3, for example, via a wired/wireless LAN (local area network), a Wi-Fi (registered trademark), Bluetooth (registered trademark), a mobile communication network (LTE (long term evolution)), or 3G (third generation mobile communication method).

(Voice Input Unit 120)

The voice input unit 120 is realized by a microphone, a microphone amplification unit that amplifies a voice signal obtained by the microphone, and an A/D converter that converts the voice signal to a digital signal and outputs the voice signal to the control unit 100.

(Operation Input Unit 130)

The operation input unit 130 receives an operation instruction of the user and outputs the operation content to the control unit 100. The operation input unit 130 may be a touch sensor, a pressure sensor, or a proximity sensor. Alternatively, the operation input unit 130 may be a physical configuration such as a button, a switch, and a lever.

(Camera 140)

The camera 140 includes a lens system including an imaging lens, a diaphragm, a zoom lens, and a focus lens, a driving system that allows the lens system to perform a focus operation and a zoom operation, and a solid-state imaging element array that photoelectrically converts an imaging light obtained by the lens system to generate an imaging signal. The solid-state imaging element array may be realized as a CCD (Charge Coupled Device) sensor array or a CMOS (Complementary Metal Oxide Semiconductor) sensor array, for example. Moreover, the camera 140 according to the present embodiment captures the images of a user around the information processing terminal 10 and the surrounding environment continuously or at a predetermined timing (intermittently, periodically, or when presence of a person is detected).

(Voice Output Unit 150)

The voice output unit 150 includes a speaker that plays a voice signal and an amplifier circuit for the speaker.

(Storage Unit 160)

The storage unit 160 is realized as a ROM (read only memory) that stores programs, calculation parameters, and the like used for processing of the control unit 100 and a RAM (random access memory) that temporarily stores parameters and the like that change as appropriate.

The user attribute and feature value information may be stored in the storage unit 160. Moreover, information on the set agent may be stored.

Hereinabove, the configuration of the information processing terminal 10 according to the present embodiment has been described in detail. Note that the configuration of the information processing terminal 10 is not limited to the example illustrated in FIG. 3. For example, the information processing terminal 10 may be realized by a plurality of devices. Moreover, the camera 140 may be an external device.

<2-2. Configuration of Agent Management Server 20>

FIG. 4 is a block diagram illustrating an example of the configuration of the agent management server 20 according to the present embodiment. As illustrated in FIG. 4, the agent management server 20 includes a control unit 200, a communication unit 210, and a storage unit 220.

(Control Unit 200)

The control unit 200 functions as an arithmetic processing device and a control device and controls an overall operation of the agent management server 20 according to various programs. The control unit 200 is realized as an electronic circuit such as, for example, a CPU (central processing unit) or a microprocessor. The control unit 200 may include a ROM (read only memory) that stores programs to be used, calculation parameters, and the like and a RAM (random access memory) that temporarily stores parameters and the like that change as appropriate.

The control unit 200 according to the present embodiment also functions as an agent selection unit 201, an agent training unit 202, and a user command processing unit 203.

The agent selection unit 201 performing matching with the attribute and feature value information of another user (including a small community unit such as a family other than an individual) who already use an agent using the attribute and feature value information of a new user (including a small community unit such as a family other than an individual) as parameters and selects the agent used by the matching other user as the base agent candidate of the new user. FIG. 5 is a diagram illustrating selection of a base agent candidate based on matching using the attribute and feature value information of the new user as parameters.

As illustrated in FIG. 5, the attribute and feature value information of a new user acquired in the initial state is compared with the attribute and feature value information of another user who uses a public agent (an agent in which a public flag described later is set ON) stored on the cloud and a similar agent of the other user is selected as the base agent candidate of the new user. When a new agent is used (for example, when a smart speaker is purchased), the family structure, the age, and the interest of the new user may be acquired by the new user answering a simple questionnaire, for example. Moreover, various kinds of information such as a family's gathering time, family's interests, and TV programs and genres that the family often watch, obtained by a microphone, a camera, and an agent speaker (the information processing terminal 10) monitoring the daily conversations and actions can be added to the attribute and feature value information of the new user. FIG. 6 illustrates an example of the user attribute and feature value information acquired in this manner. The "acceptance tendency" illustrated in FIG. 6 is information regarding a situation in which the user highly tends to accept a proposal from the agent (for example, when drinking alcohol or the night before a holiday).

Such "attribute and feature value information" is handled as "agent information" and is stored in an agent DB 221. Publicability (Availability) of the user attribute and feature value information when the agent is a matching target can be arbitrarily determined by the user. In this way, at least part of the user attribute and feature value information can be handled as personal information.

The base agent candidate selected by the agent selection unit 201 is used when the user command processing unit 203 performs user command processing. The user command processing unit 203 acquires an answer (an optimal solution) for the user in response to the request or context from the user (user command processing). The user command processing unit 203 may collect information from another server on the network as necessary.

In this way, even when a new agent is purchased, it is possible to make a response using an agent (exactly, an agent grown by another user having attributes or the like similarly to those of the new user) that has been trained to some extent or for many years and can be regarded as being individually optimized to the new user in the initial state. That is, it is more likely that the agent will recommend smarter advice and contents even before the agent is given sufficient attribute and preferences of the user. For example, even if the current obtained attributes (the attribute and feature value information of the new user acquired in the initial stage) are limited information, it is possible to use various attributes and feature values (the attribute and feature value information of the other user who uses the selected agent as the base agent candidate) associated with the selected base agent candidate. Since the attributes and the like are those of the other user (the other family), some parts may not exactly match the attributes of the new user (a new family). For example, when playing music, it can be expected that the new user is more likely to be pleased to play an animation song when the new user is with a child rather than playing appropriate music by guessing using the attributes of the other user that the music genre that the other user likes to listen when the other user is with a child is animation or J-POP. If both the attributes of the new user and the attributes of the other user have a common attribute that the TV genre that they often watch includes animation, the probability that a response "play an animation song when you are with a child" will be appreciated. Particularly, the above-mentioned master system also retains information on various attributes and feature values associated with a feature value and an individual, for example, the way of thinking and values of a family Therefore, an agent that has been used (trained) for many years by the other user having attributes similar to the attributes and the like of the new user will be likely to be an agent having values the same as or similar to those of the new user, and an agent that meets the values of a family can be obtained in a short time without taking a many years.

In a certain period from the start of use (selection of the base agent candidate), the agent selection unit 201 may perform matching repeatedly as the information on the attributes and the feature values of the new user is added and updated at any time to select a more compatible base agent candidate.

After the elapse of the certain period or when the new user performs a decision operation, the agent selection unit 201 ends the re-matching of the base agent and decides the base agent (for example, the agent information is registered in the agent DB 221). After that, the agent is trained individually as an agent dedicated for the new user by the agent training unit 202 (updating of the decided base agent). The agent training unit 202 performs machine learning continuously on the basis of the conversations and actions of the user, the user's feedback to presented information, a response history, and the like so that the agent grows into an agent more compatible with the user (specifically, for example, the user attribute and feature value information which is agent information is expanded).

FIG. 7 is a diagram illustrating a general flow of selection and decision of a base agent candidate based on the attribute and feature value information of the new user and training of the decided base agent.

When a base agent is decided, the user can arbitrarily set whether the decided (registered) agent will be open on the cloud (that is, the agent will be set as a matching target when another new user purchases a new agent) (ON/OFF of a public flag).

(Communication Unit 210)

The communication unit 210 can connect to the network 3 via cable or wirelessly to transmit and receive data to and from each information processing terminal 10 via the network 3. The communication unit 210 communicates with the network 3, for example, via a wired/wireless LAN (local area network) or a Wi-Fi (wireless fidelity, registered trademark).

(Storage Unit 220)

The storage unit 220 is realized as a ROM that stores programs, calculation parameters, and the like used for processing of the control unit 200 and a RAM that temporarily stores parameters and the like that change as appropriate. For example, the storage unit 220 according to the present embodiment stores an agent DB (database) 221.

Hereinabove, the configuration of the agent management server 20 according to the present embodiment has been described in detail. The configuration of the agent management server 20 illustrated in FIG. 4 is an example and the present embodiment is not limited thereto. For example, at least some components of the agent management server 20 may be provided in an external device, and at least some of the functions of the control unit 200 may be realized as the information processing terminal 10 or an information processing device (for example, so-called an edge server or the like) of which the communication range is relatively short and which is positioned relatively close to the information processing terminal 10.

For example, a part of the processing of the user command processing unit 203 may be performed by the information processing terminal 10. In this case, the agent information of the base agent (that is, the attribute and feature value information of the other user who uses the selected agent as the base agent) may be acquired from the agent management server 20 and be stored in the storage unit 160 of the information processing terminal 10.

3. OPERATION PROCESS

Next, an operation process of the information processing system according to the present embodiment will be described in detail with reference to the drawings.

<3-1. Base Agent Candidate Selection Process>

Figure 8:
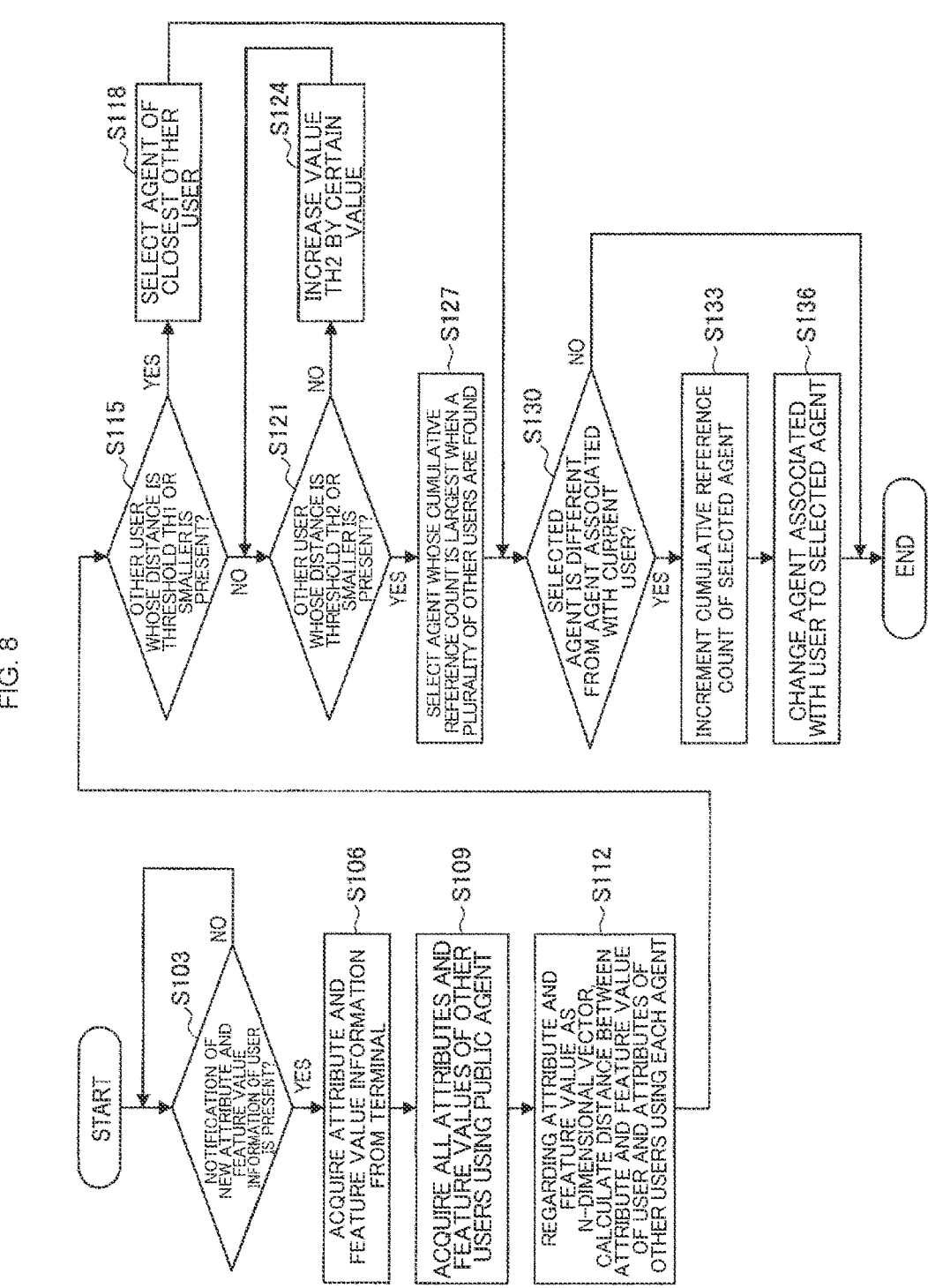
FIG. 8 is a flowchart illustrating an example of the flow of a base agent candidate selection process according to the present embodiment.

FIG. 8 is a flowchart illustrating an example of the flow of a base agent candidate selection process according to the present embodiment.

As illustrated in FIG. 8, first, when there is a notification of acquisition of new attribute and feature value information of a new user from the information processing terminal 10 (step S103: Yes), the agent management server 20 acquires the attribute and feature value information currently acquired in the information processing terminal 10 (step S106). The information processing terminal 10 continuously collects daily information on conversations and actions of the new user (by monitoring using a microphone and a camera of the information processing terminal 10) and transmits attribute and feature value information to the agent management server 20 when some features are detected (for example, a music interest, a living pattern, a TV program that the user often watches, and the like). Without being limited thereto, the information processing terminal 10 may transmit the attribute and feature value information to the agent management server 20 whenever new attribute and feature value information is acquired and may transmit voice recognition results or the like. The information processing terminal 10 may determine the degree of negative/positive conversation from the voice recognition results and transmit the determination result, for example. When the agent is newly purchased and has just been started, the information processing terminal 10 may acquire the family structure, the age, the interest, and the like of the new user by answering a simple questionnaire, for example. Furthermore, it is also possible to acquire a more direct preference by allowing the user directly to convey the evaluation on the contents and the advice recommended by the agent to the agent.

Subsequently, the agent selection unit 201 of the agent management server 20 acquires all pieces of attribute and feature value information of the other uses using each public agent from the agent DB 221 (step S109). The public agent is an agent which is approved to be open to users among agents which have already been trained to some extent or for many years (that is, optimized individually).

Subsequently, the agent selection unit 201 regards the attribute and feature value as an N-dimensional vector and calculates the distance between the attribute and feature value of the new user and the acquired attributes and feature values of the other users using each public agent. Various known methods for calculating the distance may be used. For example, a method of measuring the Euclid distance between coordinates and a method of calculating the cosine similarity of vectors when each feature value is the coordinate value on the N-dimensional space may be used. In this case, it may be better to normalize the feature values since the units thereof are different. Moreover, since the feature values range from those meaningless to those important, parameters to be used for the distance calculation and parameters that are not used may be distinguished by flags, and a weighting coefficient may be prepared for each vector so that the influence of each vector is added when calculating the distance. The weighting coefficient may be empirically prepared in advance and may be adjusted by learning agent selection and user's evaluation using machine learning or the like.

Subsequently, when another user having an attribute and feature value whose distance is equal to or smaller than a threshold TH1 is found (step S115: Yes), the agent selection unit 201 selects an agent used by the other user having the shortest distance among the other users as a base agent candidate (step S118).

On the other hand, when another user having an attribute and feature value whose distance is equal to or smaller than a threshold TH1 is not found (step S115: No), the agent selection unit 201 selects an agent having the largest cumulative reference count (step S127) among agents used by the other users whose distance is equal to or smaller than a threshold TH2 (step S121: Yes). The cumulative reference count is a value indicating the number of times the agent has been selected as the base agent candidate so far. Since the larger the cumulative reference count, the more times the agent has been used as the base agent of another user, the agent has a proven record. However, as in the case of the threshold TH1, when there is a plurality of candidates for the threshold TH2, a method of simply selecting an agent at the shortest distance may be used. Although there is a relationship that threshold TH1<threshold TH2, the threshold TH1 is assumed to be a small value close to the threshold TH2.

On the other hand, when another user is not found in the range of the threshold TH2 (step S121: No), the agent selection unit 201 increases the range of the threshold TH2 by a certain value (step S124) and steps S121 to S124 are repeated until the other user is found.

Subsequently, the agent selection unit 201 checks whether the selected agent is a base agent different from the base agent associated with the current user (step S130). Since this flow is also used when reselecting the base agent and a base agent is sometimes already associated with the new user when reselecting the base agent, this checking is performed so that the same base agent as the previous one is not selected again.

Subsequently, the agent selection unit 201 increments the reference count of the selected base agent candidate (step S133).

The agent selection unit 201 changes the agent associated with the user to the selected agent (step S136).

Decision of a candidate for the base agent selected in this manner (the base agent is referred to as a base agent "candidate" since the base agent is reselected until it is "decided") may be performed on the basis of the use situation (evaluation or reaction) of the user, for example, when the use period of the agent exceeds a certain period or when a certain level of good evaluation is obtained from the user. When the user period has not exceeded the certain period or when a certain level of good evaluation is not obtained from the user, the processing illustrated in FIG. 8 may be repeated and the base agent may be reselected. During the reselection, new attribute and feature value information of the new user may be obtained. In this way, it is possible to obtain an agent that is more compatible with the user (for example, the values thereof) in a short period and solve the cold start problem.

<3-2. Base Agent Decision Process>

Figure 9:
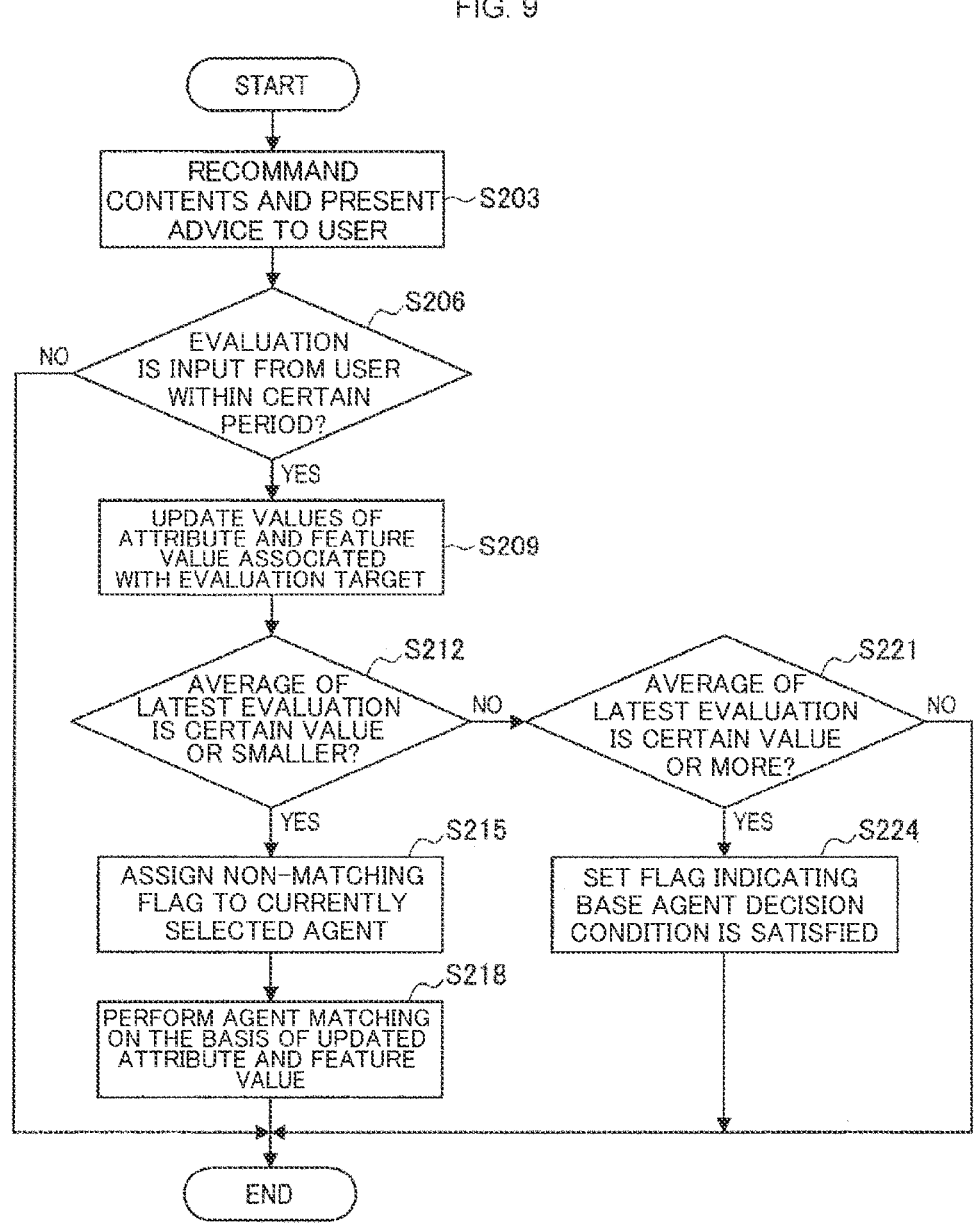
FIG. 9 is a flowchart illustrating an example of the flow of a process of deciding a base agent on the basis of the user's evaluation according to the present embodiment.

Next, an example of deciding the base agent on the basis of the user's evaluation will be described with reference to FIG. 9. FIG. 9 is a flowchart illustrating an example of the flow of a process of deciding the base agent on the basis of the user's evaluation according to the present embodiment.

As illustrated in FIG. 9, first, the user command processing unit 203 of the agent management server 20 recommends contents, presents advice, and recommends actions to the user using the base agent (step S203). The user command processing unit 203 may perform filtering such that contents or advice that is not suitable to the situation is not presented by taking the user's situation into consideration. For example, contents and advice that is not suitable when the user is with someone is not presented. Moreover, the user command processing unit 203 may refer to "acceptance tendency" included in the attribute and feature value and may recommend slightly drastic contents (contents with a high degree of serendipity) under the condition of a high acceptance tendency.

Subsequently, when the evaluation is input from the user in a certain period (step S206: Yes), the control unit 200 updates the value of the attribute and feature value associated with the evaluation target (step S209). The user's evaluation is to directly convey the evaluation of the good and bad on the content presented by the agent to the agent. The conveying method may involve, for example, saying "I like this song" or "I can't follow the advice" by voice input. New attributes and feature values of the user can be acquired by such a user's evaluation.

Subsequently, when the average of the latest evaluations is equal to or smaller than a certain value (step S212: Yes), the agent selection unit 201 assigns a non-matching flag to the currently selected base agent candidate (step S215). The "latest" may be about one month, for example. The evaluation may be a binary value of the user's likes and dislikes and may be a stepwise value including a little likes and a little dislike. The number of times a low evaluation is obtained may be used as a threshold as well as using the average of the evaluations as a threshold.

Subsequently, the agent selection unit 201 performs agent matching (reselection of the base agent) again on the basis of the updated attribute and feature value (step S218). The detailed flow is as illustrated in FIG. 8. During the reselection, agents to which a non-matching flag is assigned may be excluded.

ON the other hand, when the user's evaluation is equal to or larger than the certain value (step S221: Yes), since it can be determined that the selected base agent matches the user, the agent selection unit 201 sets a decision flag to the selected base agent (step S224). In this way, the base agent is determined.

(Introduction of Selected or Candidate Base Agent to User)

Until a base agent is decided, the base agent may be switched to various agents in the agent DB 221 (agent bank), and the user may be explicitly notified of the selection or the switching of each agent.

For example, in a state in which the user has answered an initial questionnaire at the time of purchase, when only a family structure is input, an initial agent is selected from the limited information, and the information processing terminal 10 introduces the agent, saying "I will start with a typical agent for a family of four in your age".

Subsequently, when the attribute information of the user (family) increases gradually and a new agent is selected, the information processing terminal 10 may introduce the new agent using the attribute (agent information, that is, the attribute of another user who has grown the agent for many years), saying that "Instead of the previous agent, I will respond to the preferences of your husband's western music and your wife's drama. Thank you".

When the base agent is decided, the information processing terminal 10 may introduce the agent to the user, indicating that the base agent has been decided and the agent will continue to grow, saying that "It looks like you've liked it, I will start working as your agent today. Of course, I will continue to grow to suit your preference".

(Celebrity Agent)

The agent DB 221 may store information on an agent (in the present specification, will be referred to as a "celebrity agent") used by a celebrity, for example, as well as information on agents used by general users. Such agent information is assigned with a celebrity flag. Alternatively, a general agent DB and a celebrity agent DB may be managed separately. The user may arbitrarily set the celebrity agent preferentially (or limitedly). In this case, the celebrity agent may be sold for a fee as a charge target.

<3-3. Base Agent Training Process>

Next, the processing after the base agent is decided will be described with reference to FIG. 10. After the base agent is decided, by updating (training) the decided base agent with updating of the attribute and feature value of the user, the agent can grow into an optimal agent that is more individualized to the user.

Figure 10:
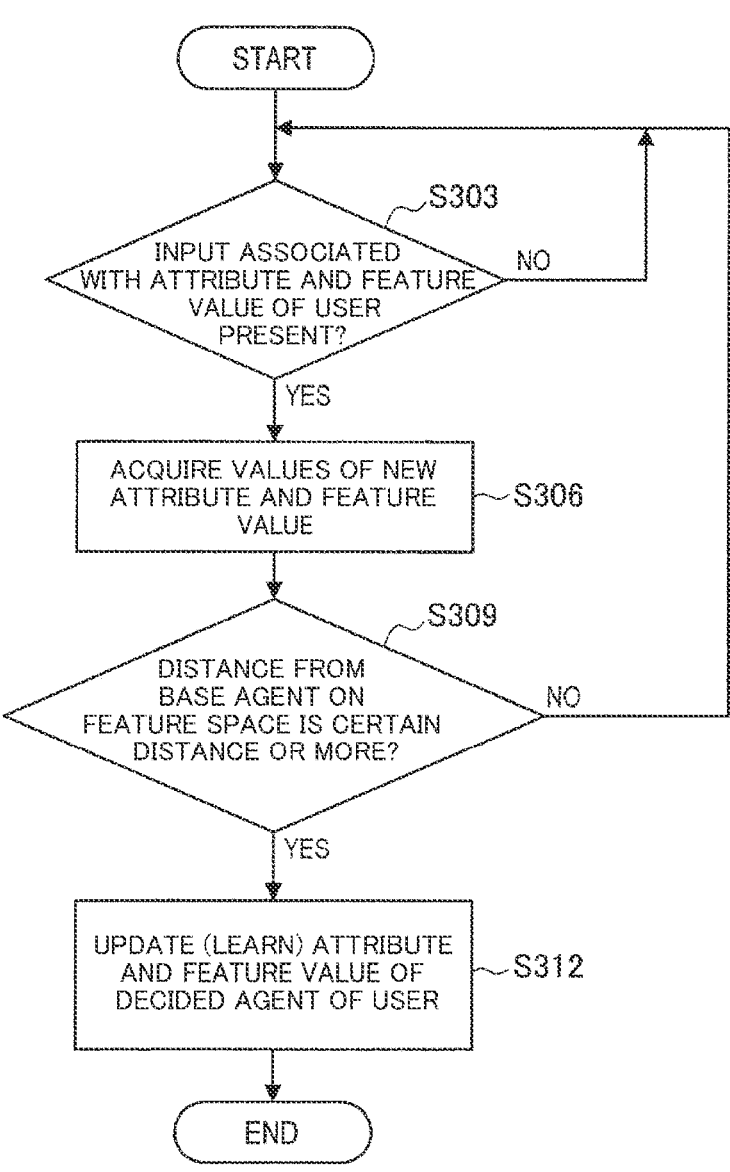
FIG. 10 is a flowchart illustrating an example of the flow of a base agent training process according to the present embodiment.

FIG. 10 is a flowchart illustrating an example of the flow of a base agent training process according to the present embodiment.

As illustrated in FIG. 10, first, when there is an input associated with the attribute and feature value of the user (step S303: Yes), the agent management server 20 acquires the value of the new attribute and feature value from the information processing terminal 10 (step S306). The input associated with the attribute and feature value of the user may be an explicit evaluation based on the preference and the attribute and feature value of the user acquired by a camera, a microphone, and other sensors. For example, the gathering time may be updated and the time to go home may be updated.

Subsequently, when the distance from the currently used base agent is a certain distance or more (step S309: Yes), the agent training unit 202 updates (learns) the attribute and feature value (the agent information stored in the agent DB 221, that is, the attribute and feature value of the user) of the agent decided by the user on the basis of the new feature value. In this way, the decided agent changes (grows) to better suit the user's preference and the like. Moreover, the "distance from the current used base agent" is the distance between the attribute and feature value of the currently used (decided) agent stored in the agent DB 221 and the new attribute and feature value of the user acquired in step S306.

In this flow, if the agent information of the user of the agent DB 221 is updated on a real-time basis when a new attribute and feature value of the user is acquired, updating of the agent occurs enormous times according to the updating of various feature values, updating is performed when there is a certain difference. However, the present embodiment is not limited thereto, and the agent DB 221 may be updated when a new attribute and feature value is acquired.

In the above-described example, the agent is always updated with the latest information. However, the present embodiment is not limited thereto, and the agent may be updated with information (before the update) in an intermediate stage.

In this way, the number of candidates when selecting the base agents of the other users increases.

<3-4. Agent Publication Approval Process>

As described with reference to FIG. 10, although the decided base agent grows by being trained according to newly acquired attribute and feature value information of the user, whether the base agent (sometimes referred to as an "agent") will be open to another new user (that is, will be allowed to be used as a base agent of another new user) may be determined according to the approval of the user.

Figure 11:
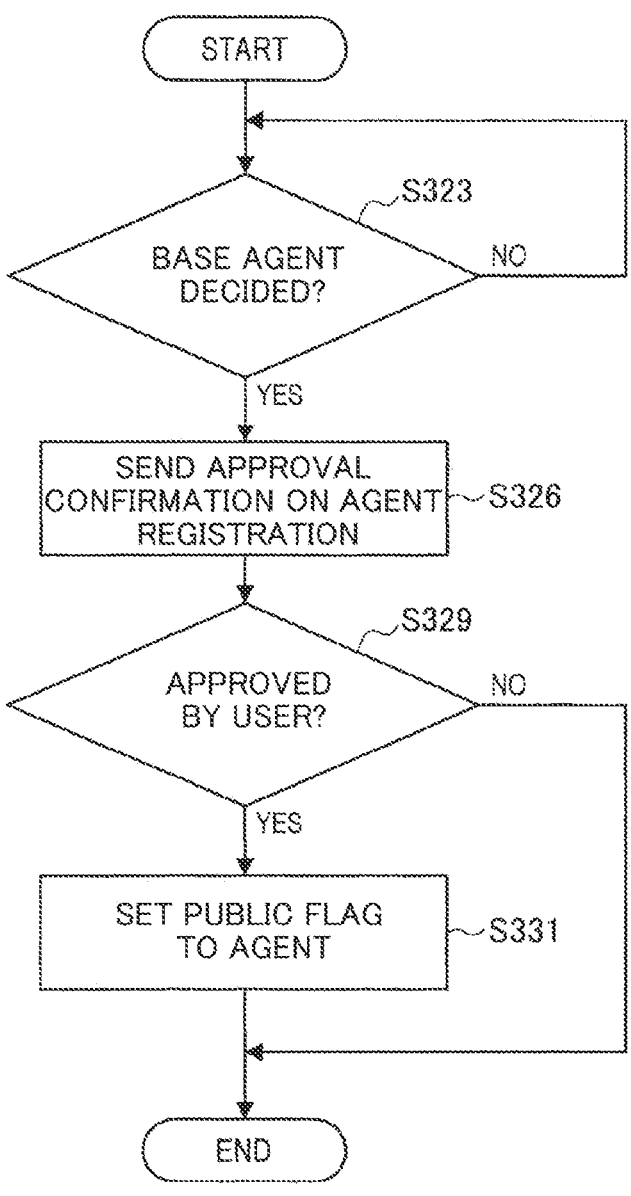
FIG. 11 is a flowchart illustrating an example of the flow of an agent publication approval process according to the present embodiment.

FIG. 11 is a flowchart illustrating an example of the flow of an agent publication approval process according to the present embodiment.

As illustrated in FIG. 11, first, when the base agent is decided (step S323: Yes), the agent management server 20 may send an approval confirmation such as "Is it okay to make the base agent open to other users?" from the information processing terminal 10 to the user (step S326).

When the user approves (step S329: Yes), the agent management server 20 sets a public flag to the agent in the agent DB 221. In this way, the agent is included in a candidate target when selecting a base agent candidate of another new user.

Since the publication approval of an agent is a benefit for the other users, some incentive may be provided to the approving user, and the service may be designed such that it is advantageous for the user to make the agent open.

In the agent DB 221, the user attribute and feature value information registered as the agent information does not include information (address, name, and the like) that can identify the individual user. However, depending on the user, since there may be a case where the user does not want to open the preference information of music and TV program in addition to the direct personal information such as a name, the user may arbitrarily set approval for each item of the attribute and feature value when approving publication.

4. CONCLUSION

As described above, in the information processing system according to the embodiment of the present disclosure, it is possible to set an optimal agent individualized to the new user.

While the preferred embodiments of the present disclosure have been described above with reference to the accompanying drawings, the present disclosure is not limited to the above examples. A person skilled in the art may find various alterations and modifications within the scope of the technical idea described in the claims, and it should be understood that they will naturally come under the technical scope of the present disclosure.

For example, a computer program for causing hardware such as a CPU, a ROM, and a RAM included in the information processing terminal 10 or the agent management server 20 to perform the functions of the information processing terminal 10 or the agent management server 20. A computer-readable storage medium having the computer program stored therein is also provided.

While examples of the operation processes according to the present embodiment have been described with reference to FIGS. 8 to 11, the operation processes illustrated in FIGS. 8 to 11 are examples and the present disclosure is not limited to the examples illustrated in FIGS. 8 to 11. For example, the present disclosure is not limited to the order of steps illustrated in FIGS. 8 to 11. At least some steps may be processed in parallel and may be processed in a reverse order. Not all of the processes illustrated in FIGS. 8 to 11 may be executed. Moreover, not all of the processes illustrated in FIGS. 8 to 11 may be executed by a single device.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Note that, the following configurations also fall within the technical scope of the present disclosure.

(1)

An information processing system that provides an agent service to users, comprising:

a database that stores a plurality of agents optimized for respective users when the agent service is used; and a control unit that selects a base agent candidate from the plurality of agents stored in the database according to an attribute or feature of a new user who newly uses the agent service.

(2)

The information processing system according to (1), wherein the control unit selects an agent of another user having an attribute or feature most similar to the attribute or feature of the new user as the base agent candidate from the plurality of agents stored in the database.

(3)

The information processing system according to (1) or (2), wherein information on the agent stored in the database is information on an attribute or feature of users who uses the agent.

(4)

The information processing system according to any one of (1) to (3), wherein the control unit reselects an agent candidate having an attribute or feature most similar to the attribute or feature of the new user updated according to a use situation of the new user with respect to a service provided by the agent candidate from the plurality of agents stored in the database.

(5)

The information processing system according to (4), wherein the control unit reselects the agent candidate when an evaluation for a certain period of the new user on the service provided by the agent candidate included in the use situation is lower than a certain value.

(6)

The information processing system according to any one of (1) to (5), wherein when the agent candidate is selected, the control unit presents information corresponding to an attribute or feature of the selected agent candidate to the new user.

(7)

The information processing system according to any one of (1) to (6), wherein the control unit decides the agent candidate as the base agent according to a use situation of the new user with respect to a service provided by the agent candidate or a use period of the service and sets the decided base agent as a base agent of the new user.

(8)

The information processing system according to (7), wherein the control unit notifies the new user of a fact that the base agent is set.

(9)

The information processing system according to (7) or (8), wherein the control unit updates an attribute or feature of the new user according to a use situation of the base agent by the new user, and when a distance between the attribute or feature of the new user and an attribute or feature of the set base agent is equal to or larger than a certain distance, the control unit updates the attribute or feature of the set base agent on the basis of the updated attribute or feature of the new user.

(10)

The information processing system according to any one of (7) to (9), wherein the control unit asks the new user whether the set base agent will be open to another user, and when approval is obtained from the new user, the control unit sets the set base agent so as to be selectable as a base agent candidate of another new user.

(11)

The information processing system according to (10), wherein the approval is set for respective items of the attribute or feature of the set base agent.

(12) An information processing method for causing a processor to execute:

storing, in a database, agents optimized for respective users when an agent service in an information processing system that provides the agent service to users is used; and selecting a base agent candidate from a plurality of the agents stored in the database according to an attribute or feature of a new user who newly uses the agent service.

(13)

A recording medium having a program recorded thereon, the program causing a computer to function as:

a database that stores agents optimized for respective users when an agent service in an information processing system that provides the agent service to users is used; and a control unit that selects a base agent candidate from a plurality of the agents stored in the database according to an attribute or feature of a new user who newly uses the agent service.

REFERENCE SIGNS LIST

1 Information processing system
10 Information processing terminal
100 Control unit
101 Voice/operation recognition unit
102 Image analysis unit
103 Speech control unit
110 Communication unit
120 Voice input unit
130 Operation input unit
140 Camera
150 Voice output unit
160 Storage unit
20 Agent management server
200 Control unit
201 Agent selection unit
202 Agent training unit
203 User command processing unit
210 Communication unit
220 Storage unit

The invention claimed is:

1. An information processing system, comprising:

a database configured to store a plurality of agents associated with each of a plurality of users, wherein the information processing system is configured to provide an agent service to the plurality of users;

an information processing terminal configured to receive an input from a first user, wherein the first user is different from the each of the plurality of users; and circuitry configured to:

determine one of a first attribute associated with the first user or a first feature associated with the first user;

determine a first base agent candidate from the plurality of agents stored in the database based on the one of the first attribute or the first feature, wherein the one of the first attribute or the first feature is associated with a first N-dimensional vector;

determine the first base agent candidate as a first agent of the first user, based on one of a use situation of the first user with respect to a specific service associated with one of the first base agent candidate or a use period of the specific service, wherein the specific service is different from the agent service;

set the determined first base agent candidate as the first agent of the first user;

determine a first distance between the first N-dimensional vector and a second N-dimensional vector, wherein the second N-dimensional vector is associated with one of a second attribute or a second feature inputted while using the determined first base agent candidate;

update the one of the first attribute or the first feature, based on one of a use situation of the first base agent candidate, the second attribute or the second feature, or

the determined first distance is equal to or greater than a specific distance;

receive, after a specific period from the use period of the specific service, evaluation data of the specific service by the first base agent candidate; and determine a second base agent candidate that is associated with one of a third attribute similar to the updated first attribute or a third feature similar to the updated first feature, wherein the determination of the second base agent candidate is based on the use situation of the first user with respect to the specific service, and a value in the evaluation data is less than a threshold value.

2. The information processing system according to claim 1, wherein the circuitry is further configured to determine a second agent of a second user as the first base agent candidate, the plurality of users includes the second user different from the first user, the second user is associated with one a fourth attribute or a fourth feature, and the one of the fourth attribute or the fourth feature is similar to the one of the first attribute or the first feature.

3. The information processing system according to claim 1, wherein the database is further configured to store information of the plurality of agents, and the stored information includes one of a plurality of attributes of the plurality of users or a plurality of features of the plurality of users.

4. The information processing system according to claim 1, wherein the circuitry is further configured to present information corresponding to the one of the second attribute or the second feature to the first user.

5. The information processing system according to claim 1, wherein the circuitry is further configured to notify the first user that the first base agent candidate is set as the first agent of the first user.

6. The information processing system according to claim 1, wherein the circuitry is further configured to:

request the first user whether the set first base agent candidate is open to a second user, wherein the second user is different from the plurality of users; and set, based on an approval from the first user, the determined first base agent candidate as a third base agent candidate of the second user.

7. The information processing system according to claim 6, wherein the circuitry is further configured to set the approval for respective items of the one of the second attribute or the second feature.

8. An information processing method, comprising:

in an information processing system:

storing, in a database, a plurality of agents associated with each of a plurality of users, wherein the information processing system provides an agent service to the plurality of users;

receiving an input from a specific user, wherein the specific user is different from the each of the plurality of users;

determining one of a first attribute associated with the specific user or a first feature associated with the specific user;

determining a first base agent candidate from the plurality of agents stored in the database based on the one of the first attribute or the first feature, wherein the one of the first attribute or the first feature is associated with a first N-dimensional vector;

determining the first base agent candidate as an agent of the specific user, based on one of a use situation of the specific user with respect to a specific service associated with one of the first base agent candidate or a use period of the specific service, wherein the specific service is different from the agent service;

setting the determined first base agent candidate as the agent of the specific user;

determining a first distance between the first N-dimensional vector and a second N-dimensional vector, wherein the second N-dimensional vector is associated with one of a second attribute or a second feature inputted while using the determined first base agent candidate;

updating the one of the first attribute or the first feature, based on one of
    a use situation of the first base agent candidate,
    the second attribute or the second feature, or
    the determined first distance is equal to or greater than a specific distance;

receiving, after a specific period from the use period of the specific service, evaluation data of the specific service by the first base agent candidate; and determining a second base agent candidate that is associated with one of a third attribute similar to the updated first attribute or a third feature similar to the updated first feature, wherein the determination of the second base agent candidate is based on
    the use situation of the specific user with respect to the specific service, and
    a value in the evaluation data is less than a threshold value.

9. A non-transitory computer-readable medium having stored thereon computer-executable instructions which, when executed by a computer of an information processing system, cause the computer to execute operations, the operations comprising:

storing, in a database in the information processing system, a plurality of agents associated with each of a plurality of users, wherein the information processing system provides an agent service to the plurality of users;

receiving an input from a specific user, wherein the specific user is different from the each of the plurality of users;

determining one of a first attribute associated with the specific user or a first feature associated with the specific user;

determining a first base agent candidate from the plurality of agents stored in the database based on the one of the first attribute or the first feature, wherein the one of the first attribute or the first feature is associated with a first N-dimensional vector;

determining the first base agent candidate as an agent of the specific user, based on one of a use situation of the specific user with respect to a specific service associated with one of the first base agent candidate or a use period of the specific service, wherein the specific service is different from the agent service;

setting the determined first base agent candidate as the agent of the specific user;

determining a first distance between the first N-dimensional vector and a second N-dimensional vector, wherein the second N-dimensional vector is associated with one of a second attribute or a second feature inputted while using the determined first base agent candidate; and updating the one of the first attribute or the first feature, based on one of
    a use situation of the first base agent candidate,
    the second attribute or the second feature, or
    the determined first distance is equal to or greater than a specific distance;

receiving, after a specific period from the use period of the specific service, evaluation data of the specific service by the first base agent candidate; and determining a second base agent candidate that is associated with one of a third attribute similar to the updated first attribute or a third feature similar to the updated first feature, wherein the determination of the second based agent candidate is based on
    the use situation of the specific user with respect to the specific service, and
    a value in the evaluation data is less than a threshold value.

\* \* \* \* \*